US006324170B1

(12) United States Patent
McClennon et al.

(10) Patent No.: US 6,324,170 B1
(45) Date of Patent: Nov. 27, 2001

(54) ECHO CONTROLLER WITH COMPENSATION FOR VARIABLE DELAY NETWORKS

(75) Inventors: R. Scott McClennon; Andre J. Robert, both of Ontario (CA)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 09/150,698

(22) Filed: Sep. 10, 1998

(51) Int. Cl.[7] .................................................. H04B 3/20
(52) U.S. Cl. ............................. 370/286; 370/289
(58) Field of Search .................................... 370/286, 289; 379/410

(56) References Cited

U.S. PATENT DOCUMENTS

| | | | |
|---|---|---|---|
| 5,099,472 | 3/1992 | Townsend et al. | 370/291 |
| 5,132,963 | * 7/1992 | Ungerboeck | 370/286 |
| 5,381,475 | * 1/1995 | Cavallo | 379/410 |
| 5,859,907 | * 1/1999 | Kawahara et al. | 379/410 |
| 5,905,717 | * 5/1999 | Hasegawa | 370/286 |

* cited by examiner

Primary Examiner—Salvatore Cangialosi
(74) Attorney, Agent, or Firm—Foley & Lardner (57) ABSTRACT

The present invention provides a method of and system for controlling and effectively reducing the echo introduced in telephone connections over variable delay networks such as LAN/WAN networks. The invention includes estimation of the round-trip user-to-user delay in the telephone connection. This estimation can be made in a number of different ways, including using timestamps in existing data packets according to a Real-Time Protocol (RTP) or a Real-Time Control Protocol (RTCP) and by sending timestamps in data packets according to an Internet Control Message Protocol (ICMP). The invention further includes determination of an echo control target for the telephone connection based upon the estimated user-to-user delay. This target represents the total amount of echo control required to limit the probability of objectionable echo to less than a predetermined threshold. The amount of echo control required increases as the length of the estimated user-to-user delay increases. The invention further includes determination of the minimum amount of signal-dependent loss required to supplement the acoustic echo cancellation in order to reach the determined echo control target. Then, in the invention, the determined amount of signal-dependent loss is applied to the telephone connection to effectively reduce echo based upon the estimated user-to-user delay.

19 Claims, 6 Drawing Sheets

| V=2 | P | X | CC | M | PT | SEQUENCE NUMBER |
|---|---|---|---|---|---|---|
| TIMESTAMP ||||||||
| SYNCHRONIZATION SOURCE (SSRC) IDENTIFIER ||||||||
| CONTRIBUTING SOURCE (CSRC) IDENTIFIER ||||||||
| ... ||||||||

FIG. 4

| V=2 | P | RC | PT=SR=200 | LENGTH |
|---|---|---|---|---|
| SSRC OF SENDER |||||
| NTP TIMESTAMP, MOST SIGNIFICANT WORD |||||
| NTP TIMESTAMP, LEAST SIGNIFICANT WORD |||||
| RTP TIMESTAMP |||||
| SENDER'S PACKET COUNT |||||
| SENDER'S OCTET COUNT |||||
| SSRC_1 (SSRC OF FIRST SOURCE) |||||
| FRACTION LOST | CUMULATIVE NUMBER OF PACKETS LOST ||||
| EXTENDED HIGHEST SEQUENCE NUMBER RECEIVED |||||
| INTERARRIVAL JITTER |||||
| LAST SR (LSR) |||||
| DELAY SINCE LAST SR (DLSR) |||||
| SSRC_2 (SSRC OF SECOND SOURCE) |||||
| ... |||||
| PROFILE SPECIFIC EXTENSIONS |||||

FIG. 5

| TYPE | CODE | CHECKSUM |
|---|---|---|
| IDENTIFIER || SEQUENCE NUMBER |
| ORIGINATE TIMESTAMP |||
| RECEIVE TIMESTAMP |||
| TRANSMIT TIMESTAMP |||

ECHO CONTROLLER WITH COMPENSATION FOR VARIABLE DELAY NETWORKS

FIELD OF THE INVENTION

The invention relates to the controlling of echo in telephone communications over variable delay networks. Specifically, the method and system of the present invention provide for the cancellation of echo when using hands-free telephones for communicating voice over a LAN/WAN network.

BACKGROUND OF THE INVENTION

Telephone connections in which one or more hands-free devices, such as speakerphones, are connected over conventional telephone networks are faced with a classic problem of controlling acoustic echo. Echo is often introduced at the hands-free devices by virtue of the close proximity of a microphone and a speaker and results in the received acoustic signal to be transmitted on the return path. This acoustic "feedback", however, is delayed by a finite amount of time, usually on the order of milliseconds. This acoustic signal is received and heard by the speaking party as an objectionable echo of the speaking party's voice.

Voice-switching, also known as switched-loss, is a commonly used technique to reduce echo. In this technique, the echo control unit inserts loss into either or both paths of the circuit connection, depending on which party is determined to be speaking at that particular time. In a speakerphone, the loss is inserted into the transmit path when the far-end user is talking (the speakerphone receive signal is declared as active). When the near-end user is talking, the loss is placed in the receive path and if neither is talking the loss may be in either path or split between them. In all cases, the loss contributes directly to control of the echo signal. When both parties are talking—such as the case where one user attempts to interrupt the other—voice-switching results in the clipping or attenuation of one or both user's speech signal(s). In effect, the connection is only half-duplex. Some hands-free devices offer full-duplex connections by using acoustic echo cancellers within the echo control unit with algorithms to model the delay path and subtract out the echo signals such that the signals transmitted from the devices do not contain a significant amount of echo. Such algorithms typically provide up to 25–35 dB of echo control with little or no supplementary voice-switching or loss due to non-linear processing which might otherwise render the call half-duplex. This amount of echo control is adequate in most conventional wireline (vs. wireless) telephone connections.

As an alternative to conventional circuit-switched networks, LAN/WAN networks and other IP networks have been employed increasingly to communicate voice and to provide for telephone connections. Accordingly, a connection over a LAN/WAN network may include one or more hands-free devices, such as speakerphones, which can potentially introduce objectionable echo into the LAN/WAN telephone connections. The round-trip delay introduced in these networks varies, and when significant, places more severe requirements for control of such echo to prevent it from being objectionable to users. In fact, for aroundtrip delays up to a few 100s of milliseconds, the requirement for echo control rises commensurate with the amount of delay in the call. In cases of high delay, greater than 100 msec for example, the required amount of echo control will be beyond the capabilities of today's acoustic echo cancellers—without the addition of adequate voice-switching or non-linear processing loss which will render such calls half-duplex. This supplementary (voice-)switched or non-linear processing loss will be denoted as signal-dependent loss.

The strategy in current high-delay voice calls, such as those made over digital wireless connections or voice-over-IP, is to add the necessary loss, via voice-switching or some non-linear processing, to achieve the necessary echo control for the worst-case expected round-trip delay. In the process, full-duplex operation is sacrificed on all calls. In LAN/WAN networks, however, the amount of delay in a call varies depending on network conditions and types. Thus the echo control strategy designed for worst-case expected delay tends to penalize call quality ("full-duplex-ness") on those calls with low delay.

SUMMARY OF THE INVENTION

Having identified the above described problems, the inventors have developed the following solution, which is embodied in the present invention. As described herein, the present invention provides a method of and system for minimizing the amount of signal-dependent loss employed to control echo in telephone connections over variable delay networks such as LAN/WAN networks. This has the advantage of maintaining fill-duplex operation wherever possible (under low-delay conditions) while avoiding objectionable echo levels (under high-delay conditions).

The method of the present invention includes first estimating the round-trip user-to-user delay in the telephone connection. This estimation can be made in a number of different ways, including using timestamps in existing data packets according to a Real-Time Protocol (RTP) or a Real-Time Control Protocol (RTCP) protocol and by sending timestamps in data packets according to an Internet Control Message Protocol (ICMP). The method further includes determining an echo control target for the telephone connection based upon the estimated user-to-user delay. This target represents the total amount of echo control required to limit the probability of objectionable echo to less than a predetermined threshold. The amount of echo control required increases as the length of the estimated user-to-user delay increases. The method further includes determining the amount of signal-dependent loss required in addition to the acoustic echo cancellation in order to reach the determined echo control target. Then, in the method of the present invention, the determined amount of signal-dependent loss is applied to the telephone connection to effectively reduce echo based upon the estimated user-to-user delay.

An echo control unit of the present invention is connected to or combined with user equipment, such as a hands-free telephone, and uses the method of the invention to control and effectively cancel echo in a telephone connection over a variable delay network while minimizing the amount of signal-dependent loss applied to the connection. The echo control unit includes a delay estimator for estimating user-to-user delay in the telephone connection, a signal dependent loss unit for determining the echo control target based upon the user-to-user delay, for determining the required amount of signal-dependent loss to be applied such that the target is reached and for applying that amount of loss to the transmit path and/or the receive path of the telephone connection.

It is a primary object of the present invention to improve the voice quality of telephone connections over variable delay networks such as LAN/WAN networks.

It is also an object of the present invention to make practical the connection of one or more hands-free devices to telephone links over variable delay networks such as LAN/WAN networks.

It is a further object of the present invention to facilitate full-duplex operation of such hands-free devices on variable delay networks during periods of relatively low delay.

It is yet a farther object of the present invention to facilitate effective echo control in telephone links with one or more hands-free devices on variable delay networks during periods of relatively high delay.

It is another object of the present invention to provide dynamic echo control over the course of a telephone call carried over a variable delay network.

Other features and advantages of the present invention will become apparent to those skilled in the art from the following detailed description. It should be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

The present invention will be described below with reference to the accompanying drawings, wherein.

DETAILED DESCRIPTION OF THE PREFERRED EMBODIMENTS

As described herein with reference to the accompanying drawings, the present invention provides a method of and system for controlling and effectively canceling echo introduced in telephone connections over variable delay networks such as LAN/WAN or other IP networks.

The method and system of the present invention can be used to control echo introduced by any number of sources in a telephone connection over a variable delay network, but is primarily directed to cancellation of echo introduced when one or more hand-free devices, such as speaker phones, are used as user terminating equipment. In "hands-free" mode, such devices operate by receiving a user's voice or other acoustic signal at a microphone of the device, and electronically transmitting it over the transmit path of the telephone connection from the hands-free user to a far-end user. A speaker of the device acoustically transmits to the hands-free user the signal received over the receive path from the far-end user over the telephone connection.

These devices often create feedback of the far-end user's acoustic signals by virtue of the close proximity of the speaker and microphone. This feedback is also delayed by a finite amount of time due to equipment delays and due to delays in the network over which the telephone connection is made. Thus, the signal transmitted from the user's hand-free device over the transmit path to the far-end user includes an echo of that far-end user's voice or acoustic signal.

This echo is objectionable when heard by the far-end user and tends to become more objectionable as the amount of time (delay) increases between the time when the original acoustic signal is created and sent and when the echo is received. The inventors have identified that delay in telephone connections made over LAN/WAN or IP networks can be considerable and can vary greatly depending on network conditions. Thus, depending upon network conditions, the actual lengths of delays may be long enough to make echo objectionable or short enough to be inconsequential.

The method and system of the present invention, as described herein, minimizes the use of switched-loss thus allowing virtual full-duplex communication during low delay conditions in the network while still performing effective echo control during periods of high delay in the network.

Figure 1:
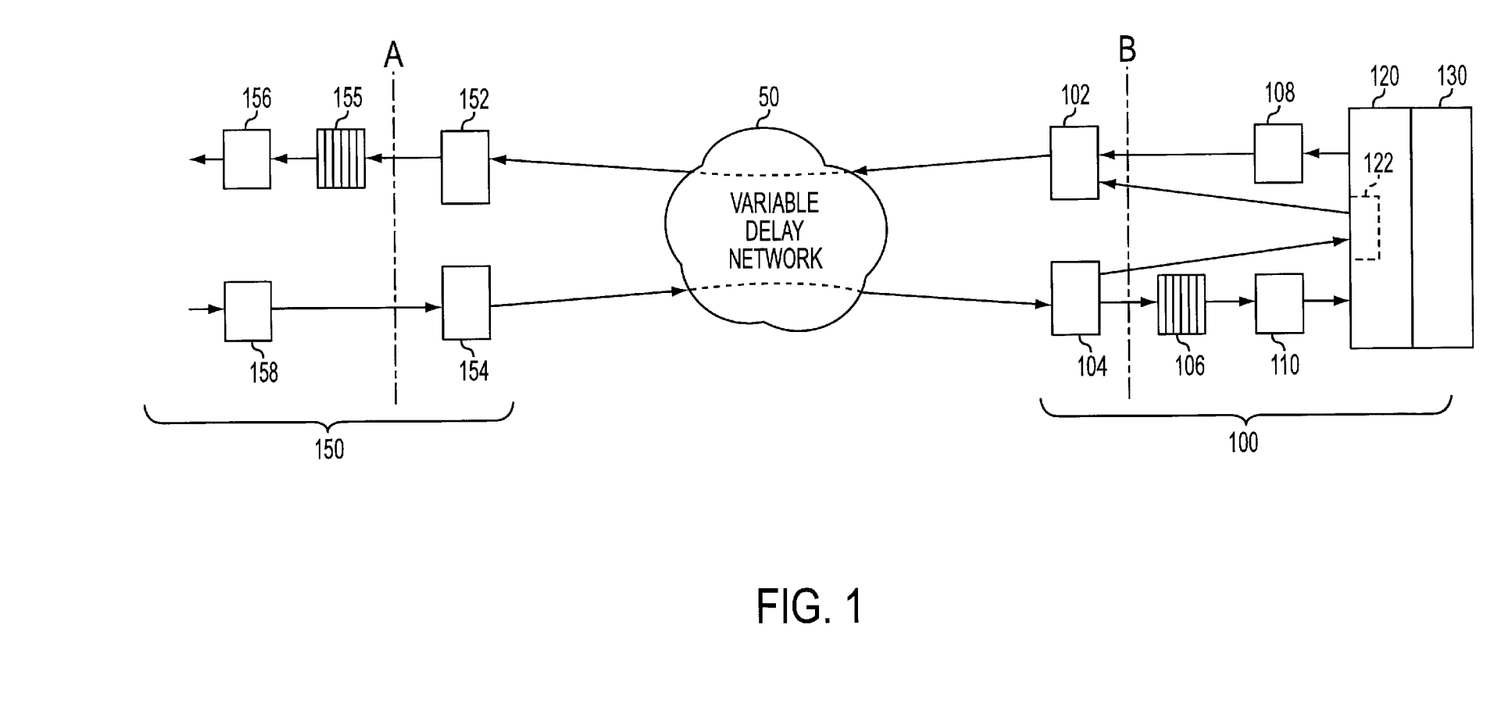
FIG. 1 is a diagram illustrating a typical telephone connection over a variable delay network and includes the echo control unit of the present invention.

As described herein, the method and system of the present invention involve estimating the round-trip user-to-user delay in a telephone connection over a variable delay network. A typical telephone connection over such a variable delay network is shown in FIG. 1. The portion of the telephone connection considered when estimating the variable delay of the network is shown between the dashed line "A" at the far-end client 150 and the dashed line "B" at the near-end (local, hands-free) client 100. For the purposes of delay estimation, the network delay includes the time required for packet assembly 102 at the near-end client, packet disassembly 152 at the far-end client, packet assembly 154 at the far-end client and packet disassembly 104 at the near-end client, as well as the transmission time over the network 50.

The delays introduced by the remaining components of the telephone connection as shown in FIG. 1 are known and do not vary substantially. These components include: the speech decoder 156, the jitter buffer 155, and the speech coder 158 of the far-end client 150 as well as the speech decoder 104, the jitter buffer 106, and the speech coder 102 of the near-end client 100. Thus, the estimation of round-trip user-to-user delay hinges primarily on estimation of the delay introduced by the variable delay network. Also shown in FIG. 1 and described herein are the echo control unit 120 including the delay estimator 122 as well as the terminating user device 130 at the near-end client. The estimate for network delay is conducted by the delay estimator 122.

Various methods can be used to estimate the delay introduced by the network, three of which are described herein. Those skilled in the art will understand that certain delay estimation methods are specific to the type of network over which the telephone connection is made. For purposes of example, and not limitation, network 100 in FIG. 1 is assumed to be a LAN/WAN type network. However, the claimed invention has applicability with other types of networks and the echo cancellation method described herein is not limited to LAN/WAN networks.

Figure 3:
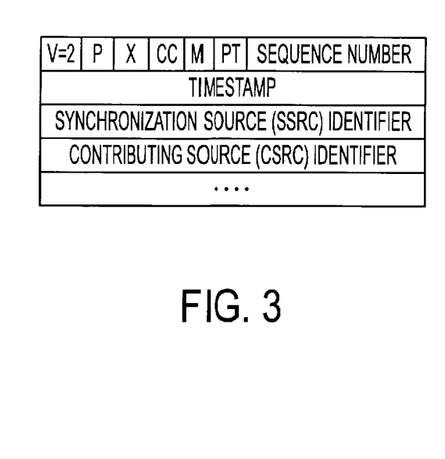
FIG. 3 illustrates estimation of user-to-user delay using RTP.

One method that can be used to estimate the delay introduced by the network involves the use of timestamps in a Real-Time Protocol (RTP). This protocol, as shown in FIG. 3, is already part of the ITU-T H.323 protocol stack adopted as the basis for interoperable voice-over LAN/WAN communications amongst equipment vendors. Estimating delay using RTP format packets is described in detail in the IETF RFC 1889: "RTP: A Transport Protocol for Real-Time Applications" by Henning Schulzrinne et al. In summary, assuming the enduser devices are synchronized to a common clock, as may be accomplished via Network Time Protocol (NTP) timestamp exchanges (IETF RFC 1119 Network Time Protocol, version 2, specification and implementation) the one-way delay through the network is given by:

delay=Current NTP time−timestamp from RTP packet

In this way, the one-way delay may be measured. The round trip delay can be estimated as double the one-way delay. An important advantage to using this method is that delay measurements can be performed based on existing voice packets. There are no extra network bandwidth requirements to make the measurements of delay. While this is the preferred method, it works well only when all users on the telephone connection support the NTP protocol.

Figure 4:
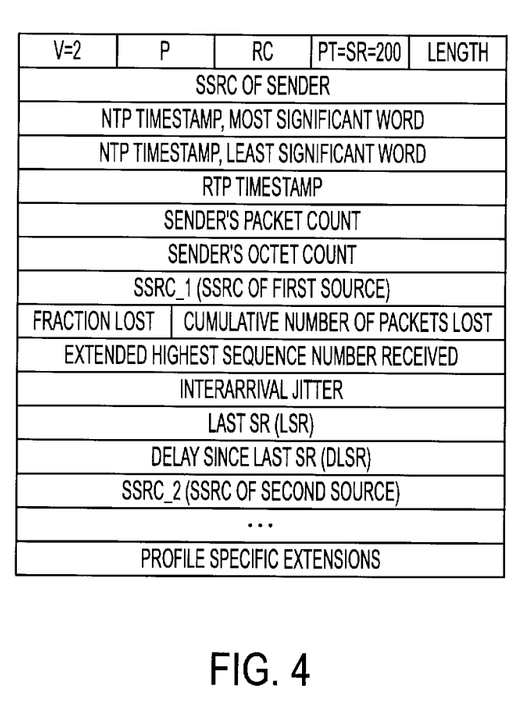
FIG. 4 illustrates estimation of user-to-user delay using RTCP.

A second method that can be used to estimate the delay introduced by the network involves the use of timestamps in the RTP Control Protocol (RTCP). This protocol, as shown in FIG. 4, is part of the RTP protocol and is used for session monitoring and may be employed to estimate the delay in the call. Estimating delay using RTCP format packets is described in detail in the aforementioned IETF RFC 1889: "RTP: A Transport Protocol for Real-Time Applications" by Henning Schulzrinne et al. In summary, the method is substantially equivalent to the RTP method described above, but employs RTCP packets as opposed to RTP packets. Like the RTP method, the RTCP method requires end-user device synchronization to a common clock and provides an estimate of the delay in one direction. The use of RTCP packets makes this method less responsive than the RTP method to sudden changes in delay; they are not transmitted as frequently as RTP packets and assume that RTCP packet delays match (in an average sense) the delays in the voice-carrying RTP packets. The amount of one-way network delay is given by:

delay=current NTP time−NTP timestamp from RTCP packet

In this way, one-way delay can be measured. The round trip delay can be estimated as double the one-way delay. This method requires the sender (far-end user terminal) to support timestamps and/or NTP timestamps.

Figure 5:
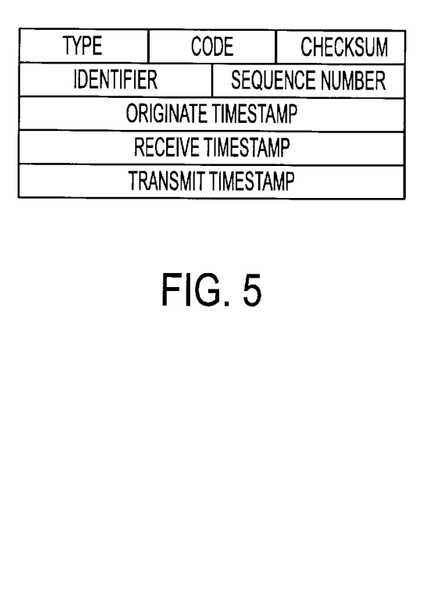
FIG. 5 illustrates estimation of user-to-user delay using ICMP.

A third method that can be used to estimate the delay introduced by the network involves the use of timestamps in an Internet Control Message Protocol (ICMP). Estimating delay using ICMP format packets is described in detail in the IETF RFC 792: "Internet Control Message Protocol" by J. Postel. In summary, the method involves time-stamping a message upon transmission from a user with an "Originate Timestamp" as shown in FIG. 5. The "Originate Timestamp" is the time, with respect to a common timing reference, that the message was transmitted from the local user. The message, upon arrival at the far-nd user, is time-stamped with a "Receive Timestamp" representing the time, with respect to the same timing reference, that the message was received at the far-end user. The difference between the "Originate Timestamp" and the "Receive Timestamp" represents the network delay from the local user to the far-end user. The same message is then returned from the far-end user to the local user with a "Transmit Timestamp" indicating the time, with respect to the common timing reference, that the message was transmitted from the far-end user. The difference between the time the message is received at the local user and the time indicated by the "Transmit Timestamp" represents the network delay from the far-end user to the local user. In this way, round-trip delay introduced by the network can be measured. In estimating using the present invention, timestamping at the near-end client, if required by the protocol and method used, is performed by the delay estimator 122.

Once round-trip delay introduced by the network is measured, using any known method, including those described above, the total round-trip user-to-user delay can be estimated. This is done by adding to the measured network delay the known delays introduced by the various equipment of both the local user and far-end user, shown in FIG. 1 to the left of line A and to the right of line B. Such equipment includes jitter buffers and speech coder/decoders at each user site. The jitter buffer is used to compensate for inter-packet arrival time variations such that the data packets are output to the decoders at precise intervals. The small amount of delay introduced by this process is known with respect to the local jitter buffer 106; the delay introduced by the far-end jitter buffer 155 is assumed to be roughly the same amount. The small amounts of delay introduced by the speech coder/decoders at each user's site are also known. In this way, the total round-trip user-to-user delay is estimated.

The estimate for round-trip user-to-user delay is preferably made at least once per call during the first few seconds of telephone connection time. The estimate is made using any known method and is made multiple times during those first few seconds of telephone connection time. The multiple samples are averaged to dampen the effects of spurious measurements.

Since network delay can vary even during the course of a telephone call, the estimate for round-trip user-to-user delay can be made periodically; once every minute, for example. However, as will be described below, not every change in the delay from one estimate to the next need result in a change to the targeted amount of echo control. The amount of echo control need only be re-calculated when the round-trip user-to-user delay changes by more than a predetermined threshold. If one or more estimates made over the course of a call indicate a considerably larger or smaller delay than previous estimates, a few additional and more frequent measurements can be made to estimate the delay before a change in the echo cancellation is made. This prevents unnecessarily frequent and audibly noticeable changes in echo control.

Figure 2:
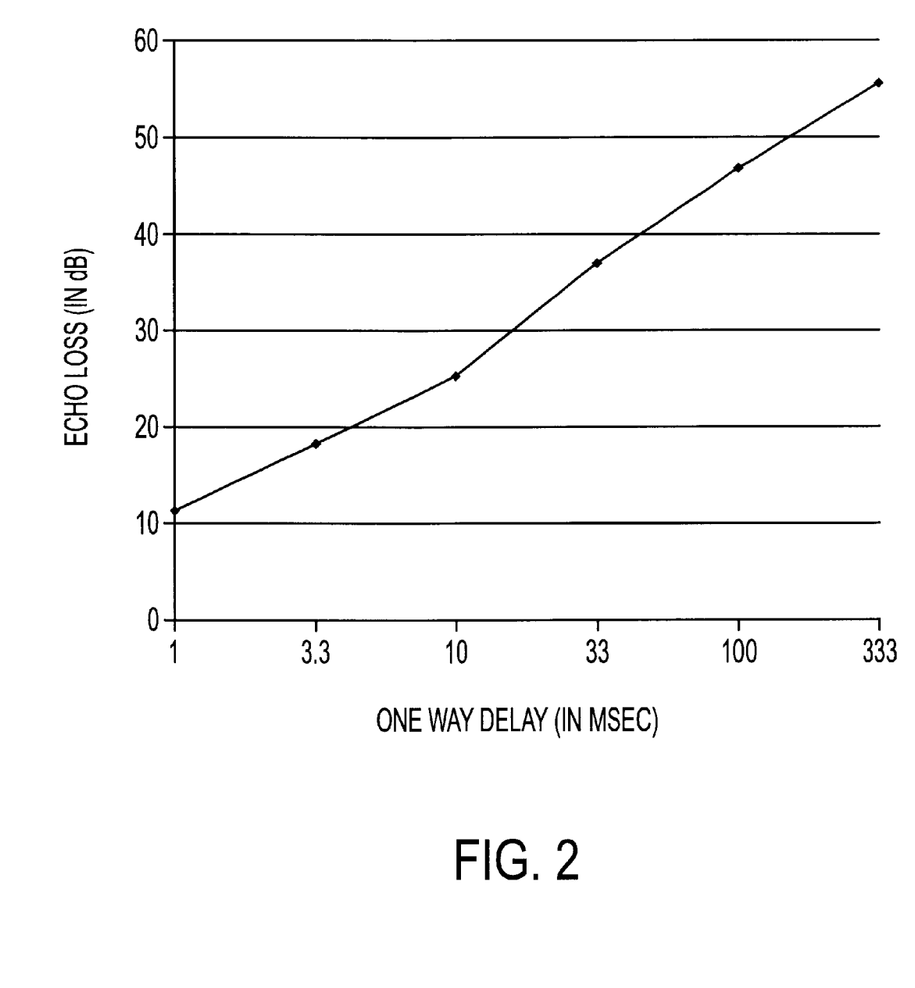
FIG. 2 is an Echo Tolerance Curve illustrating the amount of echo loss required as a function of the length of the delay in a telephone connection.

Once round-trip user-to-user delay in the telephone connection has been estimated (performed by the delay estimator 122), the echo control target can be determined. The echo control target represents the total amount of terminal coupling loss required to be applied to the telephone connection to limit the probability of objectionable echo to less than a predetermined amount. FIG. 2 illustrates the echo control target (loss in dB) as a function of the one-way delay (in milliseconds) which is half of the above described round-trip user-to-user delay, such that the probability of objectionable echo is limited to less than a 1%.

Figure 6:
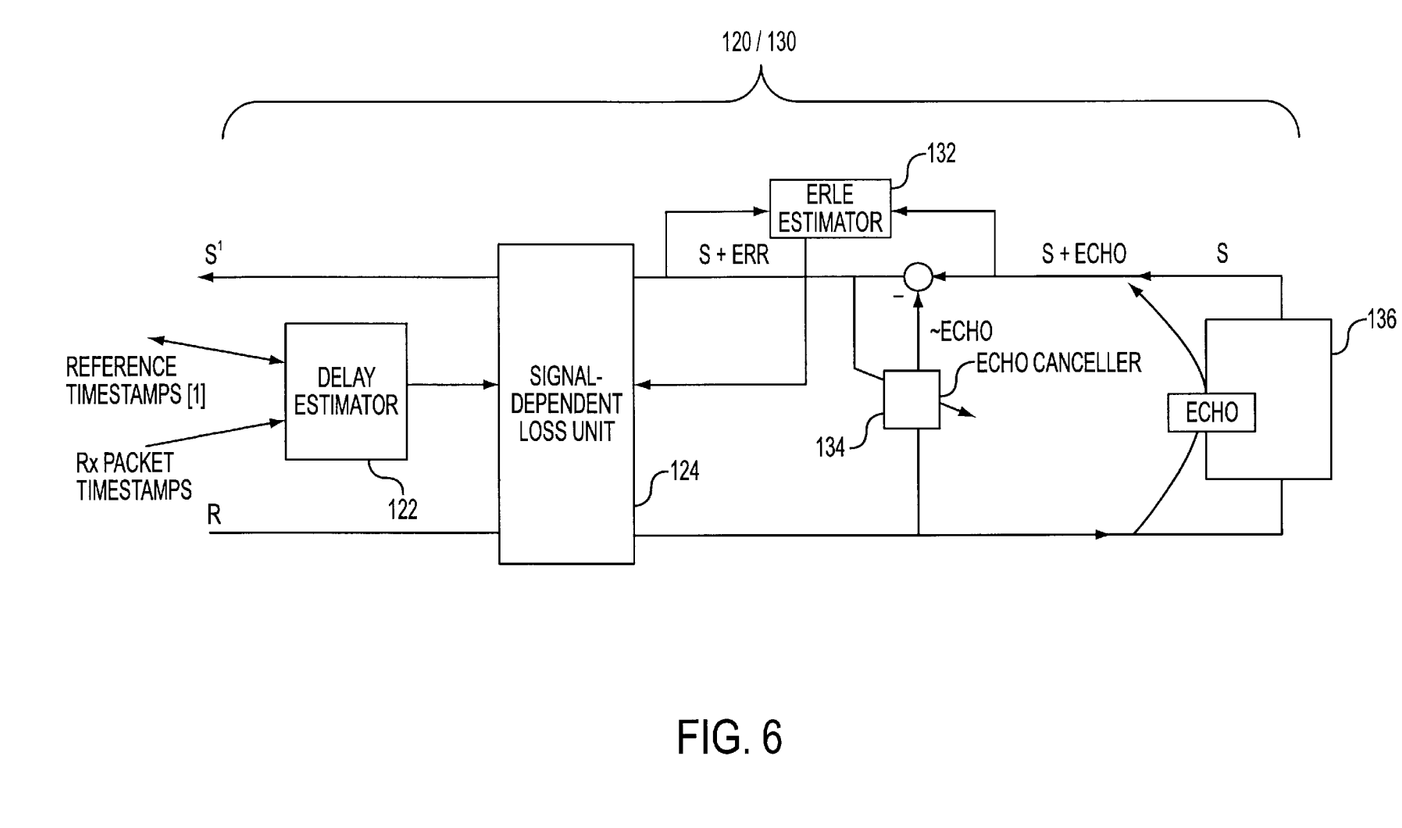
FIG. 6 illustrates an echo control unit of the present invention.

It is human nature that an echo becomes more noticeable and thus objectionable as the delay between when the original voice signal is heard and when the return echo signal is heard becomes larger. As the echo signal becomes more noticeable, larger amounts of loss must be applied to suppress it. Thus, as shown in FIG. 2, as the user-to-user delay increases, so too does the echo control target. FIG. 6 illustrates an echo control unit 120 and user device 130 in greater detail. In the system of the present invention, the echo control target is determined by the signal dependent loss unit 124 of the echo control unit 120.

As mentioned, acoustic echo cancellers, such as the echo canceller 134 shown in FIG. 6, are commonly found within echo control sections of hands-free devices and use algorithms to model and to attempt to remove echo signals. Such acoustic echo cancellers are known in the art. A typical reference describing an acoustic echo canceller for use in the present invention is U.S. Pat. No. 5,099,472 to Townsend et al. Such acoustic echo cancellers, however, are limited in that they typically cannot provide more than 30 dB of echo cancellation. In variable delay networks such as those described herein, the total amount of delay between the voice signal and the return echo signal can be very large. As shown in FIG. 2, such large delays often require more than 30 dB of echo control. Therefore, to achieve the echo control target, signal-dependent loss is applied by the signal dependent loss unit 124 to supplement the acoustic echo cancellation of echo canceller 134.

In the method and system of the present invention, the amount of switched-loss to be used in controlling echo is minimized, such that under high delay conditions, adequate echo control is still achieved while under low delay conditions, the telephone connection is virtually full-duplex in nature. In doing so, it is generally desirable to avoid application of switched-loss in excess of 15 dB. This is achieved, in part, by calculating the minimum amount of signal-dependent loss required to be applied to the telephone connection in view of the instantaneous echo control target, which is based upon the estimated round-trip user-to-user delay, the instantaneous echo cancellation characteristics of the acoustic echo canceller within the user device and the electro-acoustic loss of the hands-free device. This minimum amount of signal-dependent loss required (sd-lossmin) is calculated in accordance with the following equation:

$$\text{sd-loss}_{MIN} = \text{TCL}_{MIN}(\text{delay}_{EST}) - \text{ERLE}_{EST} - \text{EAL}_{EST}$$

TCL$_{MIN}$(delay$_{EST}$) represents the echo control target determined in the signal dependent loss unit 124 as described above with reference to FIG. 2 and as a function of the delay estimate determined in the delay estimator 122 as described above with reference to FIGS. 1, 3, 4 and 5. ERLE$_{EST}$ represents the estimated instantaneous echo control characteristics of the acoustic echo canceller within the user device. This characteristic tends to be very dynamic and changes over the course of a telephone call. The value for ERLF$_{EST}$ is provided by the ERLE estimator 132. In this way, the minimum amount of signal-dependent loss required can be determined such that the echo control target is achieved. EAL$_{EST}$ is the electro-acoustic loss measured on the speakerphone echo path in the absence of any echo control mechanism in the set. The value of EAL$_{EST}$ is determined through the electro-acoustic and mechanical design of the speakerphone 136 (affected by the distance between the handsfree speaker and microphone, for example) and is known, to within a small manufacturing tolerance, to the speakerphone designer/manufacturer.

Figure 7:
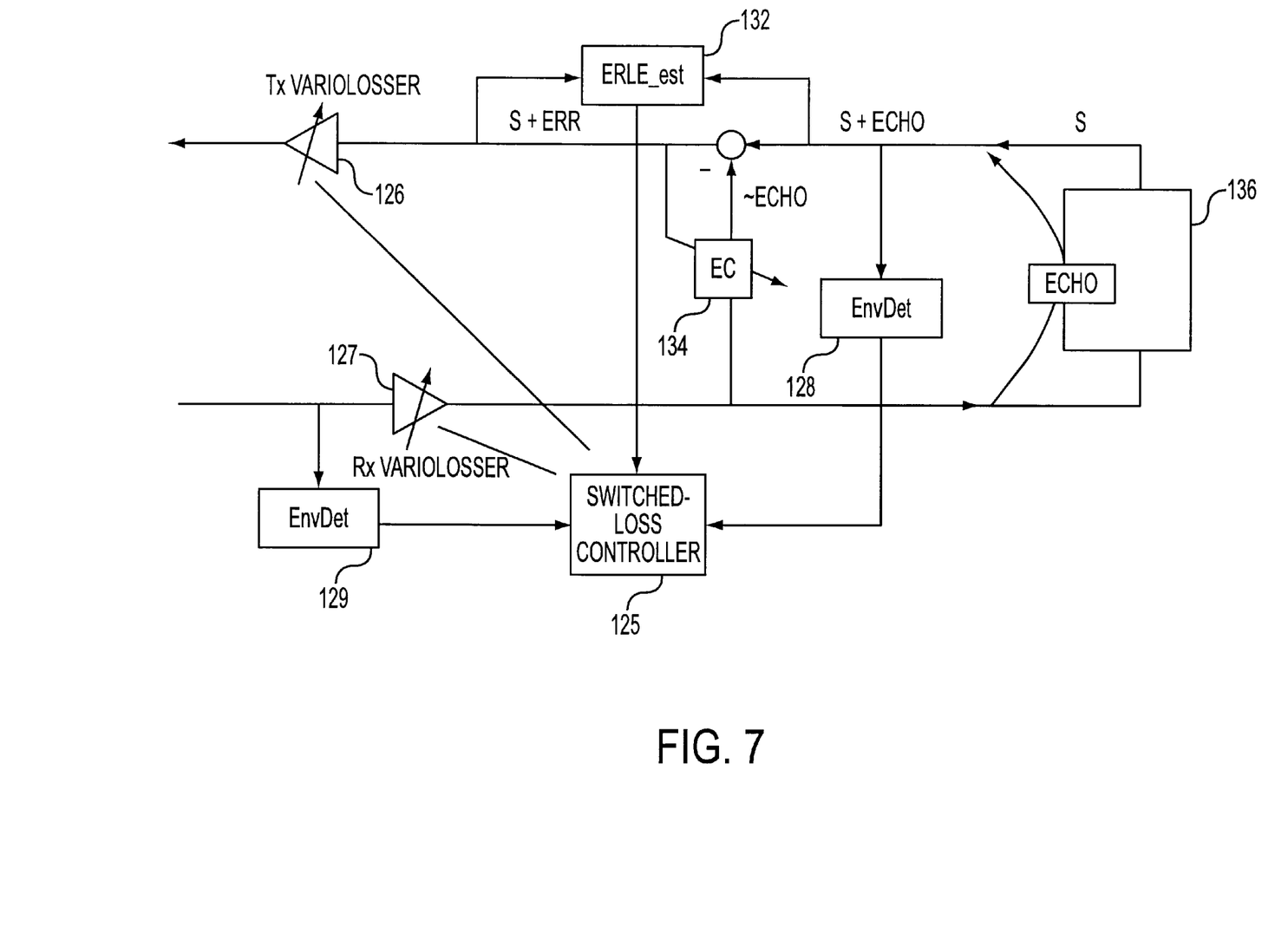
FIG. 7 illustrates operation of the echo control unit of the present invention where switched-loss is used in controlling echo.

Finally, to provide the overall targeted echo control, this determined amount of signal-dependent loss is applied to the appropriate path of the telephone connection to cancel the echo signal created, for example, by a hands-free device 136. The loss is applied o the telephone connection by the signal dependent loss unit 124. FIG. 7 shows the operational structure of the signal dependent loss unit in which switched-loss is applied to the transmit and/or receive paths by transmit and receive variolossers 126,127 controlled by a switched-loss controller 125. Envelope detectors 128,129 for determining the signal energy contained in the transmit and receive paths are connected between the switched-loss controller 125 and the respective paths. Thus, in an echo control unit employing voice-switching to deliver the signal-dependent loss, where a hands-free user is listening to the voice or other audio signals from a far-end user, echo control is realized by applying the switched-loss in the transmit path of the telephone connection at the hands-free device 136. Where the hands-free user is speaking, echo control is realized by applying the switched-loss in the receive path of the telephone connection at the hands-free device 136. When neither party is speaking the applied loss is balanced between the transmit and receive paths at the hands-free user device 136. The determination as to which party is talking is made within the echo control device, often simply by monitoring signal energy levels over time.

Figure 8:
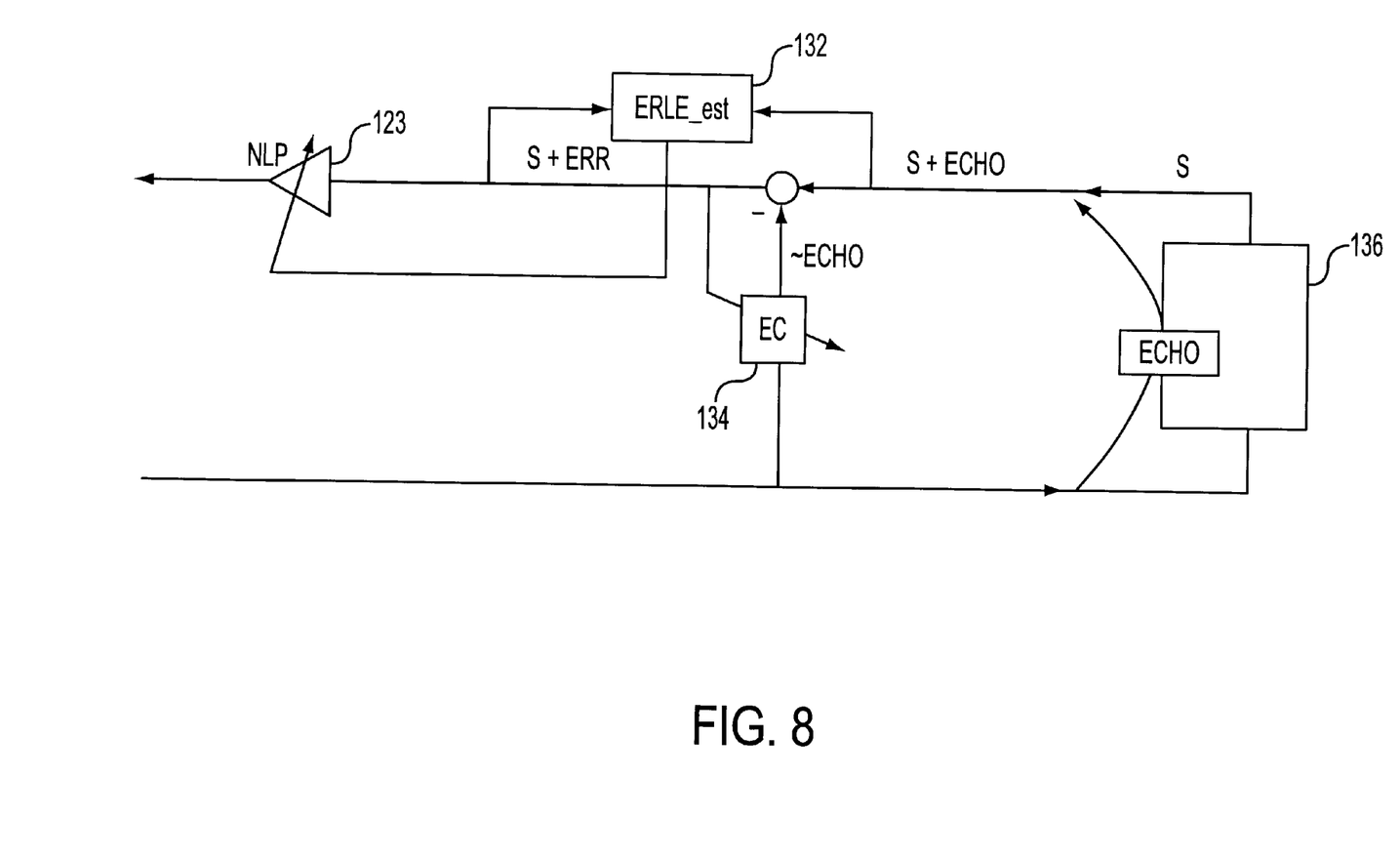
FIG. 8 illustrates operation of the echo control unit of the present invention where non-linear processing loss is applied.

As shown in FIG. 8, in an echo control unit and specifically a signal dependent loss unit (not shown) employing a non-linear processor 123 to deliver the signal-dependent loss, the signal-dependent-loss is applied in the transmit path only of the telephone connection at the hands-free device 136 whenever the transmit signal level, after the echo canceller 134, falls below some threshold (typical of residual uncancelled echo only, with no local, hands-free user talker signal present).

As mentioned above, delay estimates can be made once per call or can be made more frequently during the course of a call. Accordingly, the amount of echo control can be determined once and applied consistently over the course of a call or the echo control can be adjusted during a call to provide a dynamic echo control. In either case, there is an improvement in voice quality over existing echo control devices which are designed to compensate for the "worst-case" delay condition and accordingly incorporate a large amount of switched-loss or non-linear processing irrespective of the constantly changing delay characteristics of the network.

In the present invention, the decision to adjust the amount of signal-dependent loss to be applied to the telephone connection can result from a change in the estimated round-trip user-to-user delay and thus the echo control target. Alternatively, adjustments can be the result of changes in the estimated echo return loss enhancement, ERLEest, from the acoustic echo canceller within the user device. It is desirable, however, to limit the frequency of adjustments to the echo control applied to the telephone connection as they may be noticeable to the users.

It is intended that the invention, as described herein, includes all variations and modifications as fall within the scope of the claims and equivalents thereof.

What is claimed is:

1. A method of reducing echo in a telephone connection over a variable delay network, said method comprising:

estimating user-to-user delay in said telephone connection;

determining an echo control target for said telephone connection based upon said estimated user-to-user delay;

determining a minimum amount of signal-dependent loss to apply to said telephone connection to reach said echo control target; and applying said amount of signal-dependent loss to said telephone connection to reduce echo based upon estimated user-to-user delay.

2. A method according to claim 1, wherein said echo control target represents the total amount of echo control required to limit the probability of objectionable echo to less than a predetermined threshold.

3. A method according to claim 2, wherein said determining an echo control target further comprises calculating said echo control target, based upon said user-to-user delay, such that the amount of echo control required increases as the length of the user-to-user delay increases.

4. A method according to claim 1, wherein said user-to-user delay is estimated by estimating an amount of delay introduced by said variable delay network and adding a known amount of delay introduced by user devices terminating said telephone connection.

5. A method according to claim 4, wherein said amount of delay introduced by said variable delay network is calculated by comparing a received timestamp from a packet structured under a real-time protocol (RTP) with current network time.

6. A method according to claim 4, wherein said amount of delay introduced by said variable delay network is calculated by comparing a received timestamp from a packet structured under a real-time control protocol (RTCP) with current network time.

7. A method according to claim 4, wherein said amount of delay introduced by said variable delay network is calculated by comparing received timestamp from packet structured under an Internet Control Message Protocol (ICMP) with current network time.

8. A method according to claim 1, wherein said user-to-user delay is estimated once per telephone connection.

9. A method according to claim 1, wherein said user-to-user delay is estimated multiple times per telephone connection, during said telephone connection.

10. A method according to claim 1, wherein said echo control target is reached via a combination of echo return loss enhancement from an acoustic echo canceller and signal-dependent loss and wherein said amount of signal-dependent loss required to reach said echo control target is determined according to the formula:

$$\text{sd-loss}_{MIN} = \text{TCL}_{MIN}(\text{delay}_{EST}) - \text{ERLE}_{EST} - \text{EA}_{LEST}$$

where sd-loss$_{MIN}$ represents the amount of signal-dependent loss required, TCL$_{MIN}$(delay$_{EST}$) represents the echo control target, ERLE$_{EST}$ represents the estimated instantaneous echo return loss enhancement of the acoustic echo canceller within a user device and EAL$_{EST}$ represents the estimated electro-acoustic loss of the user device.

11. A method according to claim 1, wherein said amount of signal-dependent loss is applied to a transmit path of said telephone connection from a user device when a user of said device is primarily talking.

12. A method according to claim 1, wherein voice-switching is employed and wherein said amount of signal-dependent loss is applied to a receive path of said telephone connection to a user device when a user of said device is primarily listening.

13. An echo control unit for reducing echo in a telephone connection over a variable delay network, said echo control unit comprising:

a delay estimator, for estimating user-to-user delay in said telephone connection said variable delay network;

a signal dependent loss unit, connected to said telephone connection and to said delay estimator, for determining an echo control target based upon said user-to-user delay, for determining a minimum signal-dependent loss requirement for said telephone connection and for applying said amount of signal dependent loss to said telephone connection.

14. An echo control unit as recited in claim 13 further comprising a user device connected through a transmit path and a receive path to said signal dependent loss unit, wherein said user device comprises:

an echo canceller disposed between said transmit and receive paths for modeling echo through the user device and for removing said modeled echo from the transmit path; and an echo return loss enhancement (ERLE) estimator for estimating the reduction of echo from the transmit path achieved by the echo canceller and for providing said estimate to the signal dependent loss unit.

15. An echo control unit as recited in claim 13 wherein said echo control target determined by said signal dependent loss unit represents the total amount of echo control required to limit the probability of objectionable echo to less than a predetermined threshold.

16. An echo control unit as recited in claim 13 wherein said delay estimator determines an amount of delay introduced by said variable delay network and adds a known amount of delay introduced by user devices terminating said telephone connection.

17. An echo control unit as recited in claim 14 wherein said echo control target is reached via a combination of echo return loss enhancement from said echo canceller and signal-dependent loss and wherein said amount of signal-dependent loss required to reach said echo control target is determined according to the formula:

$$\text{sd-loss}_{MIN} = \text{TCL}_{MIN}(\text{delay}_{EST}) - \text{ERLE}_{EST} - \text{EA}_{LEST}$$

where sd-loss$_{MIN}$ represents the amount of signal-dependent loss required, TCL$_{MIN}$(delay$_{EST}$) represents the echo control target, ERLE$_{EST}$ represents the estimated instantaneous echo return loss enhancement of the acoustic echo canceller within said user device and EAL$_{EST}$ represents the estimated electro-acoustic loss of the user device.

18. An echo control unit as recited in claim 14, said signal dependant loss unit further comprising:

a switched-loss controller connected to said transmit and receive paths for calculating and applying an amount of switched-loss to said telephone connection;

a plurality of envelope detectors connecting said switched-loss controller to said transmit and receive path for estimating signal energy contained in said paths;

a transmit variolosser controlled by said switched-loss controller for applying loss to said transmit path; and a receive variolosser controlled by said switched-loss controller for applying loss to said receive path.

19. An echo control unit as recited in claim 14, said signal dependent loss unit further comprising a non-linear processor for applying said amount of signal dependent loss to said transmit path.

* * * * *